United States Patent
Monereau et al.

(10) Patent No.: US 10,525,402 B2
(45) Date of Patent: *Jan. 7, 2020

(54) METHOD FOR PRODUCING OXYGEN BY VPSA COMPRISING FOUR ADSORBERS

(71) Applicant: L'Air Liquide, Société Anonyme pour l'Etrude et l'Exploration des Procédés Georges Claude, Paris (FR)

(72) Inventors: Christian Monereau, Montpellier (FR); Guillaume Rodrigues, Les Plessis Trevise (FR); Louis Toulemonde, Douai (FR)

(73) Assignee: L'Air Liquide, Société Anonyme pour l'Etrude et l'Exploration des Procédés Georges Claude, Paris (FR)

( * ) Notice: Subject to any disclaimer, the term of this patent is extended or adjusted under 35 U.S.C. 154(b) by 134 days.

This patent is subject to a terminal disclaimer.

(21) Appl. No.: 15/561,689

(22) PCT Filed: Mar. 25, 2016

(86) PCT No.: PCT/FR2016/050677
§ 371 (c)(1),
(2) Date: Sep. 26, 2017

(87) PCT Pub. No.: WO2016/151264
PCT Pub. Date: Sep. 29, 2016

(65) Prior Publication Data
US 2018/0093219 A1    Apr. 5, 2018

(30) Foreign Application Priority Data

Mar. 26, 2015 (FR) ...................... 15 52553

(51) Int. Cl.
*B01D 53/047* (2006.01)
*C01B 13/02* (2006.01)
*B01D 53/053* (2006.01)

(52) U.S. Cl.
CPC ...... *B01D 53/0476* (2013.01); *C01B 13/0259* (2013.01); *B01D 53/053* (2013.01); *B01D 2253/104* (2013.01); *B01D 2253/106* (2013.01); *B01D 2253/108* (2013.01); *B01D 2256/12* (2013.01); *B01D 2257/102* (2013.01); *B01D 2259/4003* (2013.01); *B01D 2259/404* (2013.01); *B01D 2259/40015* (2013.01); *B01D 2259/40016* (2013.01); *B01D 2259/40052* (2013.01)

(58) Field of Classification Search
CPC .......................... B01D 53/047; B01D 53/0476; B01D 53/053; B01D 2253/104; B01D 2253/106; B01D 2253/108; B01D 2256/12; B01D 2257/102; B01D 2259/40015; B01D 2259/40016; B01D 2259/4003; B01D 2259/40052; B01D 2259/404

USPC ............... 95/96–98, 100–103, 130
See application file for complete search history.

(56) References Cited

U.S. PATENT DOCUMENTS

| | | | |
|---|---|---|---|
| 4,969,935 A | 11/1990 | Hay | |
| 5,078,757 A | 1/1992 | Rottner et al. | |
| 5,223,004 A | 6/1993 | Eteve et al. | |
| 6,132,496 A | 10/2000 | Petit et al. | |
| 6,171,371 B1 * | 1/2001 | Derive | B01D 53/0473 95/100 |
| 6,287,366 B1 * | 9/2001 | Derive | B01D 53/047 95/100 |
| 2007/0095208 A1 * | 5/2007 | Baksh | B01D 53/047 95/96 |
| 2008/0000353 A1 * | 1/2008 | Rarig | B01D 53/0446 95/100 |
| 2008/0006151 A1 * | 1/2008 | Baksh | B01D 53/0476 95/96 |
| 2016/0271554 A1 * | 9/2016 | Ritter | B01D 53/047 |

FOREIGN PATENT DOCUMENTS

| | | |
|---|---|---|
| EP | 0 350 373 | 1/1990 |
| EP | 0 758 625 | 2/1997 |
| EP | 0 948 989 | 10/1999 |

(Continued)

OTHER PUBLICATIONS

International Search Report for corresponding PCT/FR2016/050677, dated Jun. 28, 2016.
International Search Report for related PCT/FR2016/050651, dated Jun. 28, 2016.
Written Opinion for corresponding PCT/FR2016/050677, dated Jun. 28, 2016.
Written Opinion for related PCT/FR2016/050651, dated Jun. 28, 2016.
Russian Search Report for corresponding RU 2017135518/05, dated Jun. 4, 2019.

*Primary Examiner* — Frank M Lawrence, Jr.
(74) *Attorney, Agent, or Firm* — Elwood L. Haynes

(57) ABSTRACT

A method for producing oxygen by adsorbing a stream of atmospheric air, using four VPSA, one air compressor and two vacuum pumps, each adsorber undergoing a single pressure cycle including the following steps: a) producing a first stream of gas having an oxygen content T1 while loading the adsorber of the stream of atmospheric air upstream; b) producing a second stream of gas including an oxygen content T2<T1: c) producing a third stream of gas including an oxygen content T3<T2<T1 while simultaneously extracting a nitrogen-enriched residual stream; d) eluting the adsorber, from which the three streams of gas produced in steps a), b), and c) are taken with the second stream of gas produced in step b); e) repressurizing the adsorber consecutively with at least two streams, first and second repressurizing streams, with increasing oxygen content.

15 Claims, No Drawings

(56) References Cited

FOREIGN PATENT DOCUMENTS

FR 2 647 431 11/1990
RU 2 257 944 8/2005

* cited by examiner

METHOD FOR PRODUCING OXYGEN BY VPSA COMPRISING FOUR ADSORBERS

CROSS REFERENCE TO RELATED APPLICATIONS

This application is a 371 of International PCT Application PCT/FR2016/050677, filed Mar. 25, 2016, which claims priority to French Patent Application No. 1552553, filed Mar. 26, 2015, the entire contents of which are incorporated herein by reference.

BACKGROUND

The present invention relates to a process for the production of oxygen by adsorption of a stream of atmospheric air employing a unit of VPSA type comprising 4 adsorbers.

The production of oxygen from atmospheric air by units of PSA type has undergone a significant expansion in recent decades. The improvements have related to the adsorbents, the technology and the process itself.

As regards the adsorbents, the most efficient units now use, within one and the same adsorber, a first layer intended to halt the humidity of the air and at least partially carbon dioxide. It will generally concern activated alumina or doped activated alumina which favors the adsorption of $CO_2$. In the event of particularly polluted air, a portion at least of the activated alumina can be replaced with more resistant silica gel.

Halting of the nitrogen is preferably carried out on a zeolite of the LiLSX type with optionally a prelayer of zeolite of X type for halting the residual $CO_2$ and beginning to adsorb nitrogen. Several types of LiLSX, more or less exchanged with lithium, for example, and optimized as a function of the nitrogen partial pressure within the bed, can be used in successive layers. Preferably, in the zone saturated with nitrogen at the end of the production phase, an adsorbent with a high adsorption capacity will be favored, whereas, in the mass transfer zone, an adsorbent with a high Henry's constant will be favored, while taking into account the thermal effects corresponding to these choices.

The diameters (or equivalent diameters in the case of adsorbent in the rod form) are generally between 0.5 and 2 mm. The dimension selected is a function of the duration of the cycle involved and is a compromise between kinetics and pressure drops.

The process proposed here is based a priori on the use of the abovementioned adsorbents but is not limited to their use.

There have been a great many technological advances. They have concerned the valves, which are now faster, more reliable, more leaktight with regard to the atmosphere, and the like, devices, air compressors and vacuum pumps specially adapted by the manufacturers to the operating parameters of oxygen production units, drive by variable speed motor, more precise, more efficient and faster instrumentation and control system. Various types of adsorbers are used according to the flow rates involved or the local economic conditions: cylindrical adsorber having a vertical axis sometimes used in parallel until an assembly which can range, for example, up to 8 similar units for higher flow rates (reference is then made to group or cluster) is formed, cylindrical adsorber having a horizontal axis, radial adsorber. Several systems for holding the adsorbent in place and preventing attrition or fluidization have been employed (excess weight with ceramic or steel beads, membrane, balloon, spring, and the like). It is also possible to place in this field the management of the thermal effects with control of the thermal capacity of the adsorbent beds by addition of inert materials, such as phase change materials (PCMs). These types of developments, given non-exhaustively, can be applied in the context of the invention without it being able to be regarded as an improvement on what is provided here.

The last main field of improvement is the process itself. The term "process" is understood here to mean both the linking together of the stages which an adsorber will follow during its operation, and the characteristics of each of these stages: duration, amount of gas transferred, pressure, temperature, and the like.

Generally, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

- VSA processes, in which the adsorption is carried out substantially at atmospheric pressure, preferably between 0.95 and 1.25 bar abs, and the desorption pressure is less than atmospheric pressure, typically from 50 to 400 mbar abs.
- MPSA or VPSA processes, in which the adsorption is carried out at a high pressure greater than atmospheric pressure, typically between 1.5 and 6 bar abs, and the desorption is carried out at a low pressure lower than atmospheric pressure, generally between 200 and 600 mbar abs.
- PSA processes properly speaking, in which the high pressure is substantially greater than atmospheric pressure, typically between 3 and 50 bar abs, and the low pressure is substantially equal to or greater than atmospheric pressure, generally between 1 and 9 bar abs.
- RPSA (Rapid PSA) processes, for which the duration of the pressure cycle is typically less than a minute.
- URPSA (Ultra Rapid PSA) processes, for which the duration of the pressure cycle is of the order of a maximum of a few seconds.

It should be noted that these various designations are not standardized and that the limits are subject to variation according to the authors.

With the preceding definitions, the invention relates both to VSA processes and to VPSA processes. Currently, due to the cycle times used, it also concerns the RPSA process and possibly, in the future, the URPSA process. In order to simplify the text, we will confine ourselves from now on to the term VPSA in order to encompass the field of application of the invention as has just been defined.

Whatever the type of PSA, an adsorber will begin a period of adsorption until it is charged in the constituent or constituents to be halted at the high pressure and will then be regenerated by depressurization and extraction of the adsorbed compounds, before being restored, in practice repressurized, in order to again begin a new adsorption period. The adsorber has then carried out a "pressure cycle" and the very principle of the PSA process is to link together these cycles one after the other; thus a cyclical process is concerned. The time which an adsorbent takes to return to its initial state is known as cycle time. In principle, each adsorber follows the same cycle with an offset in time, which is known as phase time or more simply phase. The following relationship thus exists:

Phase time=cycle time/number of adsorbents, and it is seen that the number of phases is equal to the number of adsorbers.

There exist units comprising only a single adsorber, whereas units, such as, for example, PSA $H_2$ units, frequently comprise from 10 to 16 adsorbers.

A cycle generally comprises periods of:

Production or Adsorption, during which the feed gas is introduced via one of the ends of the adsorber, the most adsorbable compounds are adsorbed preferentially and the gas enriched in the least adsorbable compounds (product gas) is extracted via the second end. The adsorption can be carried out at an increasing pressure, at a substantially constant pressure, indeed even at a slightly decreasing pressure.

Depressurization, during which the adsorber, which is no longer fed with feed gas, is discharged via at least one of its ends of a portion of the compounds present in the adsorbent and the free spaces. Taking as reference the direction of circulation of the fluid in the adsorption period, it is possible to define cocurrentwise, countercurrentwise or simultaneously co- and countercurrentwise depressurizations.

Elution or Purge, during which a gas enriched in the least adsorbable constituents (purge gas) circulates through the adsorbent bed in order to help in the desorption of the most adsorbable compounds. The Purge is generally carried out countercurrentwise.

Repressurization, during which the adsorber is at least partially repressurized before again starting an Adsorption period. The repressurization can be carried out countercurrentwise and/or cocurrentwise, with various streams (feed, production, streams internal to the unit).

Dead time, during which the adsorber remains in the same state. These dead times can form an integral part of the cycle, making possible the synchronization of stages between adsorbers, or form part of a stage which has finished before the time assigned. The valves can be closed or remain in this state according to the characteristics of the cycle.

Depressurization and Repressurization can be carried out in different ways, in particular when the PSA unit comprises a plurality of adsorbers (or of vessels). This thus leads to individual stages being defined in order to more exactly describe the gas transfers which occur between adsorbers (or vessels) and with the external environment (low-pressure waste gas, product gas, feed circuits).

The number of adsorbers is relatively independent of the linking together chosen for the stages, that is to say of the cycle. The use of several adsorbers makes it possible to directly use a stream resulting from a first adsorber in a second adsorber if the stages in question are simultaneous. It thus makes it possible to avoid the use of intermediate vessels, to better take advantage of the pressure gradients. This can also make it possible to optimize the operation of the devices, to render the production continuous, and the like.

As will be seen, there exist, at least to date, VPSA units comprising 1, 2, 3 or 4 adsorbers. It is also possible to use, in parallel, 2—or more—units of this type by optionally making joint use of some items of equipment (air filter, mufflers, production vessels, and the like, connected).

Contrary to many processes, in the case of the production of oxygen, the starting material, that is to say atmospheric air, is free and the energy consumption of the unit is one of the dominating items in the cost of production of the oxygen. For this reason, the slightest saving with regard to specific energy, at an unchanging capital expenditure, is advantageous because it directly and substantially impacts the production costs.

This is reflected in the facts by the existence of a large number of cycles which often differ only by a slightly different management of the incoming or exiting streams or by a slightly different adaptation to the number of adsorbers used.

The use of increasingly effective simulation programs now makes it possible to explore and to compare a very large number of variants and the gradual increase in the flow rates, by reducing the relative cost of the capital expenditure, makes possible, at a reasonable cost, a greater complexity in the management of the streams.

In the same way, the improvement in the kinetics of transfer of material or of heat related either to progress with regard to the adsorbents (increase in the intrinsic kinetics) or to the possibility of using smaller particles related to developments relating to adsorbers (radial adsorber, for example, monolithic adsorber, and the like) makes it possible to shorten the duration of the cycles and consequently the size of the adsorbers.

For all these reasons (free starting material, reduced influence of the capital expenditure), the energy consumption is increasingly assuming dominance.

Starting from this, a problem which is posed is that of providing an improved process exhibiting an energetically high-performance cycle.

SUMMARY

A solution of the present invention is a process for the production of oxygen by adsorption of a stream of atmospheric air employing a unit of VPSA type comprising 4 adsorbers, 1 air compressor and 2 vacuum pumps, with each adsorber following one and the same pressure cycle with an offset of a phase time, comprising the following stages:

a) production of a first gas stream comprising an oxygen content C1 while charging upstream the adsorber with the stream of atmospheric air, b) production of a second gas stream comprising an oxygen content C2<C1, c) production of a third gas stream comprising an oxygen content C3<C2<C1 with simultaneous extraction of a waste stream enriched in nitrogen, d) elution of the adsorber, from which have emerged the three gas streams produced in stages a), b) and c), by means exclusively of the second gas stream produced in stage b) or of the third gas stream produced in stage c), e) repressurization of the adsorber which has been subjected to the elution of stage d) with successively at least two streams, a first and a second repressurization stream, having an increasing oxygen content, the first repressurization stream being the third gas stream produced in stage c) and the second repressurization stream being the second gas stream produced in stage b).

As the case may be, the process according to the invention can exhibit one or more of the following characteristics:
  the production of the second gas stream in stage b) is carried out by cocurrentwise depressurization,
  the production of the second gas stream in stage b) is carried out in two steps, a first step during which the production is carried out by cocurrentwise depressurization and a second step during which the production is carried out by a cocurrentwise depressurization combined with a countercurrentwise depressurization, the countercurrentwise depressurization is carried out by means of a valve, the repressurization stage e) is carried out with successively 3 streams, a first, a second and a third repressurization stream, having an increasing oxygen content, the first repressurization stream being the third gas stream produced in stage c), the second repressurization stream being the second gas stream produced in stage b) and the third repressurization stream being the first gas stream produced in stage a), in the repressurization stage e), the repressurization with the first repressurization stream is carried out simultaneously with the introduction of air cocurrentwise on the feed side of the adsorber for at least a portion of this stage, in the repressurization stage e), the repressurization with the second repressurization stream is carried out simultaneously with the introduction of air cocurrentwise on the feed side of the adsorber for at least a portion of this stage, in the repressurization stage e), the repressurization with the third repressurization stream is carried out simultaneously with the introduction of air cocurrentwise on the feed side of the adsorber for at least a portion of this stage, the pressure at the end of stage a) is between 1.75 and 1.25 bara, preferably between 1.55 and 1.45 bara, the pressure at the end of stage b) is between 1.5 and 1.0 bara, preferably between 1.30 and 1.20, the pressure at the end of stage c) is between 1.0 and 0.7 bara, preferably between 0.90 and 0.80, and the low pressure of the pressure cycle is between 0.25 and 0.45 bara, preferably between 0.40 and 0.30, the cycle time of said unit is less than 60 seconds, preferably between 15 and 45 seconds, at least one vacuum pump, preferably a centrifugal vacuum pump, comprises one or more stages, in parallel and/or in series, chosen from the group formed by positive displacement devices of lobe, vane or liquid ring, in particular water ring, type, the air compressor C-air continuously feeds one of the 4 adsorbers, the first gas stream produced in stage a) is sent at least in part to a first holding tank, the second gas stream produced in stage b) is sent at least in part to a second holding tank.

The new cycle proposed here corresponds to the use of 4 adsorbers which will thus each follow this cycle with an offset in time between them of a phase time (equal to the cycle time divided by 4).

DESCRIPTION OF PREFERRED EMBODIMENTS

The solution proposed here is more simple than the solutions of the prior art as it results only in the production of three streams of decreasing purity and differs with regard to the use of these streams in the cycle. The elution is carried out entirely with just one stream, whereas the repressurization is carried out by successively using the streams produced of increasing purity.

The cycle proposed in the context of the present invention is thus characterized by the sequences i, i+1 and i+2, during which the unit produces 3 successive streams rich in oxygen and of decreasing purity. Stage i corresponds to stage a) and thus to the production proper with a mean purity C1 which generally corresponds to the specification requested by the client; let us take, by way of example, 93 vol % $O_2$. During this stage, the adsorber is fed with air via an air compression unit (C-air).

The stage referenced i+1 corresponds to stage b) and thus to the production of a second stream rich in oxygen but with a mean purity C2 lower than the preceding one; let us take, by way of example, 91 vol % $O_2$. This fraction can be produced with or without introduction of air and/or without extraction of waste at the other end of the adsorber. More specifically, the adsorber can be isolated on the air side and the oxygen fraction is produced by cocurrentwise decompression, or air can be introduced during only a fraction of this stage or throughout the duration of the stage, at nominal or reduced flow rate. It is also possible to simultaneously withdraw, during all or a part only of the stage, by countercurrentwise depressurization, a stream rich in nitrogen. These different possibilities are represented by two empty squares as described below, which characterizes this stage i+1 (stage b)) being the production of oxygen at a mean purity C2 lower than that of the production of oxygen in stage a) C1.

The stage referenced i+2 corresponds to stage c) and thus to the production of a third stream rich in oxygen with a mean purity C3 lower than the preceding one; let us take 89 vol % $O_2$. This stream is obtained by a cocurrentwise decompression simultaneous with a countercurrentwise decompression intended to simultaneously extract, from the adsorber, a stream rich in nitrogen. According to the pressure level, this countercurrentwise decompression can be carried out via a valve and/or via a vacuum pump. In practice, it will generally concern at least at the stage end a vacuum pumping and, for simplicity, the representation [VP] has been adopted to mean these different possibilities, VP being taken for "vacuum pumping" and the presence of square brackets meaning that the vacuum pumping stage is not obligatory.

The management in the cycle of these different oxygen fractions produced is characterized by the linking together of the following sequences: Stage j corresponds to a stage of simple vacuum pumping in order to extract nitrogen. The production side of the adsorber is isolated.

Stage j+1 corresponds to a stage of elution with pumping. A gas rich in oxygen is introduced on the production side simultaneously with the pumping. The presence of oxygen facilitates the desorption of the nitrogen.

Stages j+2, j+3 and j+4 are stages of repressurization of the adsorber.

The elution of stage j+1 is carried out solely with the gas resulting from stage b), corresponding to stage i+1 which was defined above, or solely with the gas resulting from stage c), corresponding to stage i+2.

The repressurization is carried out, for its part, by successive stages with streams of increasing oxygen purity: a first repressurization stream which is the third gas stream produced in stage c), a second repressurization stream which is the second gas stream produced in stage b) and optionally a third repressurization stream which is the first gas stream produced in stage a). According to the operating conditions, the contribution of the third repressurization may be weak and can be avoided, for simplicity. It is this which is meant here by the presence of square brackets: [C1].

There exist several ways of representing, in summarizing fashion, the cycles of a unit of PSA type.

Use will be made here of the tables method, in which each individual stage appears in one square. The cycle can be defined by describing all of the stages which an adsorber performs during a cycle. Preferably, the description of the different phases which the different adsorbers follow simultaneously are represented one under the other. If it is desired to be exhaustive, the operation of each adsorber is described one under the other. Each square defines a stage by an abbreviated title (Prod, Eq, Purge, and the like). This representation is very compact and very practical. However, since an incoming or exiting stream has several uses, this method loses clarity as it becomes difficult to simply define the corresponding stage. Nevertheless, this remains the method currently most widely used.

Use has been made here of an intermediate method in the form of a table where, for each stage, the incoming and exiting streams of the adsorber are defined. This method has already been used in a somewhat different form. Thus, for example:

| Prod |
| --- |
| ⇑ |
| 1 |
| ⇑ |
| C-air | means that the adsorber is in stage 1 and that it receives as feed a stream resulting from a compressor (C-air), this stream being, in the context of the invention, atmospheric air. The stream corresponding to the production (Prod) exits at the opposite end of the adsorber.

| X |
| --- |
| X |
| j |
| ⇓ |
| VP | means that stage j is a stage of simple placing under vacuum via a vacuum pump connected to the feed end while the production side is closed (X).

The two top or bottom squares are left empty, if what takes place respectively on the production side or feed side is not formally defined or is not to be defined at this moment for a satisfactory understanding of the cycle, that is to say, for example, that the fact that there is an extraction, an injection of gas or that the end is isolated is not characteristic of the stage in question and that all the cases, indeed even their combination, for example an injection followed by an extraction, are possible.

The family of cycles relating to the present invention can then be characterized by the following table, the columns left free meaning that, besides the 8 stages described, there may be additional stages, such as those corresponding to a change of vacuum pump, a final repressurization simply with air, and the like:

| C1 (Prod) | C2 | C3 | X | C2 or C3 | C3 | C2 | [C1] [Prod] |
| --- | --- | --- | --- | --- | --- | --- | --- |
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ |  | ⇓ | ⇓ | ⇓ |  |  |  |
| C-air |  | [VP] | VP | VP |  |  |  |

According to a preferred embodiment, the elution is carried out solely with the second gas stream produced in stage b) (i+1).

The characteristic stages are then:

| C1 (Prod) | C2 | C3 | X | C2 | C3 | C2 | [C1] [Prod] |
| --- | --- | --- | --- | --- | --- | --- | --- |
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ |  | ⇓ | ⇓ | ⇓ |  |  |  |
| C-air |  | [VP] | VP | VP |  |  |  |

It should be noted that the distinction between the 2 vacuum pumps employed is not made at this level, the pressure cycle not being complete.

According to one embodiment, the production of a second gas stream rich in oxygen according to stage b) is carried out by simple cocurrentwise depressurization, corresponding to the following characteristic stages:

| C1 (Prod) | C2 | C3 | X | C2 or C3 | C3 | C2 | [C1] [Prod] |
| --- | --- | --- | --- | --- | --- | --- | --- |
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ | X | ⇓ | ⇓ | ⇓ |  |  |  |
| C-air | X | VP | VP | VP |  |  |  |

According to another embodiment, the production of the second gas stream rich in oxygen according to stage b) is carried out in two substages, first by simple cocurrentwise depressurization and then still by cocurrentwise depressurization but simultaneously with a countercurrentwise depressurization, preferably toward the atmosphere via a valve. The latter operation corresponds to the following characteristic substages k-a and k-b relating to the production of the stream of purity Pur2, which substages replace stage i+1 in the table above.

|  | C2 |
| --- | --- |
| ⇑ | ⇑ |
| k-a | k-b |
| X | ⇓ |
| X | ATM |

According to another preferred embodiment, the initial repressurization of the adsorber with the third gas stream produced in stage c) is carried out simultaneously with the cocurrentwise introduction of air on the feed side during all or part of this stage. As the adsorber is under vacuum, this introduction of air can be carried out directly from the atmosphere via a valve. It can be an all or nothing valve or a valve whose opening changes throughout the stage. The opening may only be carried out the course of the stage with regard to a time delay or a pressure threshold. This opening is one of the parameters to be optimized. The most effective simulation software makes it possible to determine the tendencies to be observed. Onsite adjustments can make it possible to refine the opening characteristics. As it is not obligatory to pass through the vacuum pump and as it is possible for this injection of air to be reduced, indeed even zero, the representation [ATM] has been adopted to represent these operating possibilities, hence the representative stages:

| C1 (Prod) | C2 | C3 | X | C2 or C3 | C3 | C2 | [C1] [Prod] |
|---|---|---|---|---|---|---|---|
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ | X | ⇓ | ⇓ | ⇓ | ⇓ | ⇑ | ⇑ |
| C-air | X | [VP] | VP | VP | [ATM] | | |

In this variant, the possibility is retained of carrying out the elution with the second or the third gas stream with respective purities C2 or C3 but, preferably, the elution is carried out by means of the second gas stream produced in stage b).

According to another preferred embodiment, the repressurization of the adsorber with the second gas stream produced in stage b) is carried out simultaneously with the cocurrentwise introduction of air on the feed side during all or part of this stage and preferably throughout the entire stage. As the adsorber is under vacuum, the bulk of the repressurization with air can be carried out directly from the atmosphere via a valve. It can be an all or nothing valve or a valve whose opening changes throughout the stage. The opening may only be carried out the course of the stage with regard to a time delay or a pressure threshold. This opening is one of the parameters to be optimized. As said above, the air is preferably introduced throughout this stage and the corresponding representation is then as follows:

| C1 (Prod) | C2 | C3 | X | C2 or C3 | C3 | C2 | [C1] [Prod] |
|---|---|---|---|---|---|---|---|
| ⇑ | ⇑ | ⇑ | X | ⇓ | ⇓ | ⇓ | ⇓ |
| i | i + 1 | i + 2 | j | j + 1 | j + 2 | j + 3 | j + 4 |
| ⇑ | X | ⇓ | ⇓ | ⇓ | ⇑ | ⇑ | ⇑ |
| C-air | X | [VP] | VP | VP | [ATM] | ATM | |

In this variant, the possibility is retained of carrying out the elution with the second or the third gas stream with respective purities C2 or C3 but, preferably, the elution is carried out by means of the second gas stream produced in stage b).

According to a variant, the optional repressurization of the adsorber with gas resulting from the production of oxygen is carried out simultaneously with the cocurrentwise introduction of air on the feed side. In view of the pressure cycle, this optional repressurization takes place around atmospheric pressure or entirely above atmospheric pressure. It is then necessary to use a compression means (C-air) in order to introduce the atmospheric air into the adsorber.

According to a preferred embodiment, the cycle additionally comprises a final repressurization of the adsorber with solely introduction of air on the feed side. This stage then precedes stage a) of production of oxygen with the purity C1. The duration of this stage is determined by a time delay or by a pressure threshold. The air is generally introduced from the air compressor C-air as the adsorber is at a pressure greater than atmospheric pressure at least at the stage end. This stage takes place after the repressurization stage e).

As each adsorber is under vacuum during a not insignificant part of the cycle, the air which is used to repressurize the adsorber under these conditions (to a pressure lower than atmospheric pressure) can be introduced in all or in part without passing through the means for compression of the atmospheric air C-air. Nevertheless, if, during a portion of this time, this compressor is available, that is to say that there is no other adsorber which is using compressed air, a portion or all of the air can pass through it, the device then not consuming energy (indeed even producing it).

Based on the preceding characteristics, the invention then relates to a process for the production of oxygen from atmospheric air by means of a unit of VPSA type comprising 1 air compressor C-air, 2 vacuum pumps VP1 and VP2 and 4 adsorbers which each follow an identical cycle with an offset in time of a phase time, it being possible for said cycle to be provided in one of the different forms below Cyc 1 to Cyc 6, all in accordance with the principle of the invention, which differ only by the presence or absence of a repressurization with oxygen resulting from the production itself, followed or not followed by a recompression with air before the production stage, and by the point of the cycle where a change from one vacuum pump (VP1) to the other (VP2) is carried out.

For all the cycles which follow, 3 stages per phase have been arbitrarily selected for the sake of simplicity but it should be noted, for example, that, for the first cycle Cyc 1, stages 5 and 6, on the one hand, or 8 and 9, on the other hand, might be combined together without changing anything in the operation of the VPSA. The first and fourth phases for their part comprise 3 distinct stages which have led to this choice. It should be noted that the starting point of the description of the cycle was the production but that it would have been possible to choose another stage in order to start, like the stage referenced 10 here, which corresponds to the start of the repressurization of the adsorber.

In the cycles Cyc 1 to Cyc 3, the vacuum pump VP2 finishes the process of placing under vacuum begun by the pump VP1 (stage 7) before carrying out the elution (stages 8 and 9).

In view of the fact that the vacuum pump VP1 is available over the entire duration of a phase, it has been accepted, in the following cycles, that the countercurrentwise depressurization of stage 4 was carried out through the vacuum pump, even if the pressure in the adsorber was momentarily greater than atmospheric pressure, this being for the purpose of minimizing the energy consumed. Nevertheless, it is understood that the depressurization gas fraction at a pressure greater than atmospheric pressure or a portion of this gas can be vented directly without passing through the vacuum pump for mechanical reasons or for increasing the bleed-off flow rate.

| | | | | | | Cyc 1 | | | | | |
|---|---|---|---|---|---|---|---|---|---|---|---|
| X | C1 (Prod) | C2 | C3 | X | X | X | C2 or C3 | C3 | C2 | C1 (Prod) | |
| X | ⇑ | ⇑ | ⇑ | X | X | X | ⇓ | ⇓ | ⇓ | ⇓ | ⇓ |
| 1 | 2 (i) | 3 (i + 1) | 4 (i + 2) | 5 (j) | 6 (j) | 7 (j) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle comprising a repressurization with a fraction of the product simultaneous with a repressurization with air (stage 12), followed by a final repressurization with air (stage 1).

| | | | | | | Cyc 2 | | | | | |
|---|---|---|---|---|---|---|---|---|---|---|---|
| C1 (Prod) | C1 (Prod) | C2 | C3 | X | X | X | C2 or C3 | C3 | C2 | X | |
| ⇑ | ⇑ | ⇑ | ⇑ | X | X | X | ⇓ | ⇓ | ⇓ | ⇓ | X |
| 1 (i) | 2 (i) | 3 (i + 1) | 4 (i + 2) | 5 (j) | 6 (j) | 7 (j) | 8 (j + 1) | 9 (j + 1) | 10 (j + 2) | 11 (j + 3) | 12 |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle without repressurization with oxygen of the production but with a final repressurization with air (stage 12), following the stage of repressurization with the Pur2 stream (stage 11). The following stage (stage 1) is a production stage.

| | | | | | | Cyc 3 | | | | | |
|---|---|---|---|---|---|---|---|---|---|---|---|
| C1 (Prod) | C1 (Prod) | C2 | C3 | X | X | X | C2 or C3 | C3 | C2 | | C1 (Prod) |
| ⇑ | ⇑ | ⇑ | ⇑ | X | X | X | ⇓ | ⇓ | ⇓ | ⇓ | ⇓ |
| 1 (i) | 2 (i) | 3 (i + 1) | 4 (i + 2) | 5 (j) | 6 (j) | 7 (j) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle with repressurization with oxygen produced simultaneously with a repressurization with air (stage 12), followed by the start of the production (stage 1).

In the cycles Cyc 4 to Cyc 6, the adsorber is placed under vacuum with the single pump VP1 and the elution is carried out solely with the vacuum pump VP2. Between the preceding cycles and these, the ratio of the sizes of the vacuum pumps is mainly modified, VP1 here being greater in size and VP2 being smaller in size. The ratio of the volume flow rates (m$^3$/h) of the vacuum pumps VP1 and VP2 generally ranges from 1 to 1 to 1 to 2.

| | | | | | | Cyc 4 | | | | | |
|---|---|---|---|---|---|---|---|---|---|---|---|
| X | C1 (Prod) | C2 | C3 | X | X | | C2 or C3 | | C3 | C2 | C1 (Prod) |
| X | ⇑ | ⇑ | ⇑ | X | X | ⇓ | ⇓ | ⇓ | ⇓ | ⇓ | ⇓ |
| 1 | 2 (i) | 3 (i + 1) | 4 (i + 2) | 5 (j) | 6 (j) | 7 (j + 1) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle comprising a repressurization with a fraction of the product simultaneous with a repressurization with air (stage 12), followed by a final repressurization with air (stage 1).

| | | | | | | Cyc 5 | | | | | |
|---|---|---|---|---|---|---|---|---|---|---|---|
| C1 (Prod) | C1 (Prod) | C2 | C3 | X | X | | C2 or C3 | | C3 | C2 | X |
| ⇑ | ⇑ | ⇑ | ⇑ | X | X | ⇓ | ⇓ | ⇓ | ⇓ | ⇓ | X |
| 1 (i) | 2 (i) | 3 (i + 1) | 4 (i + 2) | 5 (j) | 6 (j) | 7 (j + 1) | 8 (j + 1) | 9 (j + 1) | 10 (j + 2) | 11 (j + 3) | 12 |

| Cyc 5 | | | | | | | | | | | |
|---|---|---|---|---|---|---|---|---|---|---|---|
| C1 (Prod) | C1 (Prod) | C2 | C3 | X | X | C2 or C3 | | | C3 | C2 | X |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle without repressurization with oxygen of the production but with a final repressurization with air (stage 12), following the stage of repressurization with the stream of C2 purity (stage 11). The following stage (stage 1) is a production stage.

| Cyc 6 | | | | | | | | | | | |
|---|---|---|---|---|---|---|---|---|---|---|---|
| C1 (Prod) | C1 (Prod) | C2 | C3 | X | X | C2 or C3 | | | C3 | C2 | [C1] [Prod] |
| ⇑ | ⇑ | ⇑ | ⇑ | X | X | ⇓ | ⇓ | ⇓ | ⇓ | ⇓ | ⇓ |
| 1 (i) | 2 (i) | 3 (i + 1) | 4 (i + 2) | 5 (j) | 6 (j) | 7 (j + 1) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle with repressurization with oxygen produced simultaneously with a repressurization with air (stage 12), followed by the start of the production (stage 1).

It should be noted that the stages 3 of the cycles Cyc 1 to Cyc 6 can be replaced with the 2 substages 3-a and 3-b as explained above without changing the fundamental characteristics of the cycles, namely the production of the streams of C1, C2 and C3 purity and their use in the cycle.

| | C2 |
|---|---|
| ⇑ 3-a | ⇑ 3-b |
| X | ⇓ |
| X | ATM |

Preferably, the invention relates to a process for the production of oxygen from atmospheric air by means of a unit of VPSA type comprising 1 air compressor (C-air), 2 vacuum pumps (VP1 and VP2) and 4 adsorbers which each follow an identical cycle with an offset in time of a phase time, it being possible for said cycle to be provided in one of the different forms below Cyc 7 to Cyc 12, all also in accordance with the principle of the invention, which constitute a selection with respect to the preceding cycles using exclusively the oxygen stream of intermediate purity C2 as elution gas. As for the preceding, more general, series, they differ from one another only, on the one hand, in the presence or absence of a repressurization with oxygen resulting from the production itself, followed or not followed by a recompression with air before the production stage, and, on the other hand, in the point of the cycle where a change from one vacuum pump (VP1) to the other (VP2) is carried out.

In the cycles Cyc 7 to Cyc 9, the vacuum pump VP2 finishes the process of placing under vacuum begun by the pump VP1 (stage 7) before carrying out the elution (stages 8 and 9).

| Cyc 7 | | | | | | | | | | | |
|---|---|---|---|---|---|---|---|---|---|---|---|
| X | C1 (Prod) | C2 | C3 | X | X | X | C2 | C2 | C3 | C2 | C1 (Prod) |
| X | ⇑ | ⇑ | ⇑ | X | X | X | ⇓ | ⇓ | ⇓ | ⇓ | ⇓ |
| 1 | 2 (i) | 3 (i + 1) | 4 (i + 2) | 5 (j) | 6 (j) | 7 (j) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle comprising a repressurization with a fraction of the product simultaneous with a repressurization with air (stage 12), followed by a final repressurization with air (stage 1).

| Cyc 8 | | | | | | | | | | | |
|---|---|---|---|---|---|---|---|---|---|---|---|
| C1 (Prod) | C1 (Prod) | C2 | C3 | X | X | X | C2 | C2 | C3 | C2 | X |
| ⇑ | ⇑ | ⇑ | ⇑ | X | X | X | ⇓ | ⇓ | ⇓ | ⇓ | X |
| 1 (i) | 2 (i) | 3 (i + 1) | 4 (i + 2) | 5 (j) | 6 (j) | 7 (j) | 8 (j + 1) | 9 (j + 1) | 10 (j + 2) | 11 (j + 3) | 12 |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle without repressurization with oxygen of the production but with a final repressurization with air (stage 12), following the stage of repressurization with the Pur2 stream (stage 11). The following stage (stage 1) is a production stage.

| Cyc 9 | | | | | | | | | | | |
|---|---|---|---|---|---|---|---|---|---|---|---|
| C1 (Prod) | C1 (Prod) | C2 | C3 | X | X | X | C2 | C2 | C3 | C2 | C1 [Prod] |
| ⇑ | ⇑ | ⇑ | ⇑ | X | X | X | ⇓ | ⇓ | ⇓ | ⇓ | ⇓ |
| 1 (i) | 2 (i) | 3 (i + 1) | 4 (i + 2) | 5 (j) | 6 (j) | 7 (j) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle with repressurization with oxygen produced simultaneously with a repressurization with air (stage 12), followed by the start of the production (stage 1).

In the cycles Cyc 10 to Cyc 12, the adsorber is placed under vacuum with the single pump VP1 and the elution is carried out solely with the vacuum pump VP2. Between the preceding cycles and these, the ratio of the sizes of the vacuum pumps is mainly modified, VP1 here being greater in size and VP2 being smaller in size.

| Cyc 10 | | | | | | | | | | | |
|---|---|---|---|---|---|---|---|---|---|---|---|
| C1 (Prod) | C1 (Prod) | C2 | C3 | X | X | C2 | C2 | C2 | C3 | C2 | [C1] [Prod] |
| ⇑ | ⇑ | ⇑ | ⇑ | X | X | ⇓ | ⇓ | ⇓ | ⇓ | ⇓ | ⇓ |
| 1 (i) | 2 (i) | 3 (i + 1) | 4 (i + 2) | 5 (j) | 6 (j) | 7 (j + 1) | 8 (j + 1) | 9 (j + 1) | 10 (j + 2) | 11 (j + 3) | 12 (j + 4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle comprising a repressurization with a fraction of the product simultaneous with a repressurization with air (stage 12), followed by a final repressurization with air (stage 1).

| Cyc 11 | | | | | | | | | | | |
|---|---|---|---|---|---|---|---|---|---|---|---|
| C1 (Prod) | C1 (Prod) | C2 | C3 | X | X | C2 | C2 | C2 | C3 | C2 | X |
| ⇑ | ⇑ | ⇑ | ⇑ | X | X | ⇓ | ⇓ | ⇓ | ⇓ | ⇓ | X |
| 1 (i) | 2 (i) | 3 (i + 1) | 4 (i + 2) | 5 (j) | 6 (j) | 7 (j + 1) | 8 (j + 1) | 9 (j + 1) | 10 (j + 2) | 11 (j + 3) | 12 |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle without repressurization with oxygen of the production but with a final repressurization with air (stage 12), following the stage of repressurization with the stream of C2 purity (stage 11). The following stage (stage 1) is a production stage.

| | | | | | | | | | | | |
|---|---|---|---|---|---|---|---|---|---|---|---|
| | | | | | Cyc 12 | | | | | | |
| C1 (Prod) | C1 (Prod) | C2 | C3 | X | X | C2 | C2 | C2 | C3 | C2 | [C1] [Prod] |
| ⇑ | ⇑ | ⇑ | ⇑ | X | X | ⇓ | ⇓ | ⇓ | ⇓ | ⇓ | ⇓ |
| 1 (i) | 2 (i) | 3 (i+1) | 4 (i+2) | 5 (j) | 6 (j) | 7 (j+1) | 8 (j+1) | 9 (j+1) | 10 (j+2) | 11 (j+3) | 12 (j+4) |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | [ATM] | ATM | C-air |

Cycle with repressurization with oxygen produced simultaneously with a repressurization with air (stage 12), followed by the start of the production (stage 1).

It should be noted that the stages 3 of the cycles Cyc 7 to Cyc 12 can be replaced with the 2 substages 3-a and 3-b as explained above without changing the fundamental characteristics of the cycles, namely the production of the streams of C1, C2 and C3 purity and their use in the cycle.

| | C2 |
|---|---|
| ⇑ | ⇑ |
| 3-a | 3-b |
| X | ⇓ |
| X | ATM |

The reader is likewise reminded that the recompression with air during stage 10 of all the cycles (Cyc 1 to Cyc 12) represented by [ATM] may be limited, may occur only in the course of the stage, over a period of time or a pressure threshold, indeed even be eliminated. This choice will be able to depend on the external conditions, in particular on the climatic conditions, rather than a fine optimization of the cycle, in order to obtain the best possible performance levels.

The presence of a high level of relative humidity associated with a high external temperature, such as may be found in a tropical region, for example, can result in the introduction of air being slowed down during stage 10 in order to prevent excessively high contamination of the adsorbent. Conversely, with low relative humidity or in cold weather, it can be more advantageous to immediately introduce atmospheric air, in conjunction with the oxygen stream of third purity. These effects can be evaluated as a function of the size selected for the bed(s) intended to halt the secondary impurities. Here again, this is a matter for optimization. Thus, in a country which is rather cold and dry on average and on a site which is relatively uncontaminated ($CO_2$ content of less than or equal to 400 ppm, for example), use will preferably be made of the cycle Cyc 13, which is only a selection of the cycle Cyc 8 in which atmospheric air is introduced from the start of stage 10.

This case corresponds to the table below:

| C1 (Prod) | C1 (Prod) | C2 | C3 | X | X | X | C2 | C2 | C3 | C2 | X |
|---|---|---|---|---|---|---|---|---|---|---|---|
| ⇑ | ⇑ | ⇑ | ⇑ | X | X | X | ⇓ | ⇓ | ⇓ | ⇓ | X |
| 1 (i) | 2 (i) | 3 (i+1) | 4 (i+2) | 5 (j) | 6 (j) | 7 (j) | 8 (j+1) | 9 (j+1) | 10 (j+2) | 11 (j+3) | 12 |
| ⇑ | ⇑ | X | ⇓ | ⇓ | ⇓ | ⇓ | ⇓ | ⇓ | ⇑ | ⇑ | ⇑ |
| C-air | C-air | X | VP1 | VP1 | VP1 | VP2 | VP2 | VP2 | ATM | ATM | C-air | or to its variant referenced Cyc 14, represented here with the substages 3-a and 3-b but which might equally well be represented by retaining only 3 stages for the first phase: 1 corresponding to the production (C1) and 2, 3 dedicated to the C2 production. It will again be noticed, on this subject, that it is not the detailed representation of a cycle, subject to modifications such as that described above, which characterizes the invention but clearly the production of the 3 oxygen streams having a decreasing $O_2$ content and their use as repressurization gas and elution gas.

| | | | | | | | | | | | |
|---|---|---|---|---|---|---|---|---|---|---|---|
| | | | | | Cyc 14 | | | | | | |
| C1 (Prod) | C1 (Prod) | C2 | C2 | C3 | X | X | X | C2 | C2 | C3 | C2 | X |
| ⇑ | ⇑ | ⇑ | ⇑ | ⇑ | X | X | X | ⇓ | ⇓ | ⇓ | ⇓ | X |
| 1 (i) | 2 (i) | 3-a (i+1) | 3-b (i+1) | 4 (i+2) | 5 (j) | 6 (j) | 7 (j) | 8 (j+1) | 9 (j+1) | 10 (j+2) | 11 (j+3) | 12 |
| ⇑ | ⇑ | X | ⇓ | ⇓ | ⇓ | ⇓ | ⇓ | ⇓ | ⇓ | ⇑ | ⇑ | ⇑ |
| C-air | C-air | X | ATM | VP1 | VP1 | VP1 | VP2 | VP2 | VP2 | ATM | ATM | C-air |

It should be noted that it is easy to modify these cycles, including in operation, in order to take into account winter/summer climatic variations, by varying the amount of air introduced during the start of the repressurization (stage 10), for example by bringing forward or by delaying this introduction.

More generally, it is possible to provide for the possibility of passing, among the cycles described above, from one cycle to another, depending on the change in the operating conditions (purity of the product, production throughout, external temperature and/or temperature for entry into the adsorbers). The cost of the energy in the event of seasonal variations, for example, the need to periodically use a cycle with a greater regeneration power in order to carry out the equivalent of an exceptional regeneration of the adsorbent used to retain the secondary impurities, and the like, can also result in modifications to the pressure cycle, while always remaining within the context of the invention. The addition to the repressurization of a fraction of the product (C1) can be an example of these momentary modifications.

It should also be noted that, while remaining within one and the same cycle, it is possible to adapt, to the true operating conditions, a certain number of parameters, such as amounts of gas transferred, for example the amount of elution gas, the duration of certain stages, while obviously retaining in this case identical phase times and the constraints of simultaneousness or of duration to which reference has previously been made, the inlet temperature of the air in the adsorbers (assuming that there exists a means of heating or of cooling). The various intermediate pressures can constitute in particular good adjustment parameters.

On taking the example of the cycle Cyc 13, it will be possible to add, for example, an additional 2 seconds to stages 2, 5, 8 and 11 or, on the contrary, to remove a second from these same stages, if it proved to be the case that one or the other modification is advantageous.

The 2 vacuum pumps VP1 and VP2 do not operate a priori within the same pressure range. VP1 starts from atmospheric pressure, indeed even is initially fed at a slightly greater pressure of the order of 1.1 to 1.2 bar abs, and brings the adsorber below atmospheric pressure down to a pressure generally of between 0.45 and 0.65 bar abs, while VP2 has a lower suction pressure starting from 0.65 to 0.45 to range to 0.45 to 0.35 bar abs. It will thus be possible to adapt the choice of the devices to their different operating conditions. This will certainly vary their size (pumping capacity, expressed in m$^3$/h) but also the type of device.

Thus, according to a preferred embodiment, the first vacuum pump (VP1), which starts the process of placing the adsorber under vacuum, comprises one or more stages, in parallel and/or in series, chosen from the group formed by positive displacement devices of lobe (Roots), vane or liquid ring, in particular water ring, type. Pumps of the lobe (Roots) type can be dry or with injection of water depending upon whether simplicity or specific energy is favored.

The second vacuum pump (VP2) comprises one or more stages, in parallel or in series, chosen from the group formed by positive displacement devices of lobe (Roots), vane, liquid ring, in particular water ring, screw or centrifugal type. The compression ratio of this device varies less than that of the first and it is then possible to advantageously use other types of devices which may be more efficient under these conditions.

The first and second vacuum pumps can thus be of different type, as set out above.

In particular, the pressure cycle is generally such that the pressure at the end of stage 9 is equal to the pressure at the start of stage 7 to plus or minus 100 millibars, preferably to plus or minus 50 millibars.

More specifically, the pressure cycle can be such that the pressure in the adsorber during stages 7, 8 and 9, which correspond to the operating range of VP2, remains within a pressure range equal to P plus or minus 100 millibars, preferably equal to P plus or minus 50 millibars, P being a pressure of between 0.45 and 0.3 bara. As the discharge pressure is atmospheric pressure, the compression ratio will remain virtually constant, of approximately between 2 and 3.

Preferably, the pressure in the adsorber during stages 7, 8 and 9 remains equal to 450 mbar abs plus or minus 100 millibars, preferably plus or minus 50 mbar.

During the operation of the vacuum pump VP2, it is possible to adjust, if necessary, the elution gas flow rate between the start and the end of the stage, either in order to optimize the performance levels of the cycle or to favor the operation of the vacuum pump, in particular in the case of a centrifugal device.

If reference is made to any one of the cycles Cyc 1 to Cyc 12, it may be pointed out that it is advisable to introduce a certain number of constraints with regard to the duration of the stages in order to have the optimum cycle, that is to say to avoid unnecessary holding tanks or at the very least to minimize their size and to ensure continuous operation of the devices. In particular, the fact that the duration of stage 4 is equal to the duration of stage 10 makes it possible to start the repressurization directly with the stream of third purity produced during stage 4.

Likewise, preferably, the duration of stage 12 is equal to the duration of stage 3, making it possible for the air compressor C-air to operate continuously, the sum of the durations of stages 12, 1 and 2 being equal to one phase of the cycle. This also explains the choice made here relating to the whole series of preferred cycles (Cyc 1 to 12), namely that the stream of intermediate purity C2 is obtained in stage 3 (or 3-a and 3-b) by simple cocurrentwise decompression and/or by simple cocurrentwise decompression simultaneous with a depressurization toward the atmosphere, thus avoiding, during this stage, the use of any one device.

For certain transfers, it is preferable, in order not to lengthen the cycle by introducing, for example, dead times, to use holding tanks. Generally, these tanks may receive the entire gas stream withdrawn and simultaneously provide a portion of the latter, if necessary, or else may receive only the excess, the portion used simultaneously going directly to the adsorber concerned. The first solution makes possible better homogenization of the stream but can result in enlarging some pipelines. Thus, the oxygen produced at the second purity (C2) during stage 3 is sent, at least in part, into a first holding tank.

Unless the oxygen product feeds, at the production pressure, a network of sufficient volume, the oxygen constituting the product (C1) produced at the first purity during stages 1 and 2 is sent, at least in part, into a second holding tank.

The productive output (total production at the required purity or flow rate of oxygen regarded as pure per m$^3$ of adsorber, of total adsorbent, of adsorbent dedicated to $O_2/N_2$ separation according to the definitions selected) is all the higher as the cycle time is short and as the intrinsic performance levels of the adsorbent and of the cycle are maintained. This involves equally well the mass transfer kinetics, the pressure drops (and thus, consequently, the geometry of the adsorber), the time for working the valves, and the like.

With the current technology, the cycle times are generally less than a minute and preferably lie within the range 15/45 seconds.

The thermal effects internal to the VPSAs following the cycles recommended by the invention will advantageously be improved by using phase-change materials, and/or adsorbents having a heat capacity improved by the addition of inert. It is known in particular that the use of an adsorbent with an inert core increases the heat capacity of the particle, rendering the cycle more isothermal, but also increases the mass transfer kinetics. Use can be made of this latter characteristic to shorten the duration of the stages or to decrease the pressure drops by using particles with a greater size isokinetically. The document FR 2 794 993 describes an adsorbent particle of this type.

The cycles according to the invention can also be used in conjunction with the use, instead of particulate adsorbents, of contactors, in particular parallel-passage contactors and preferably monolithic contactors. A representation of these contactors can be found, for example, in the document FR 2 952 553.

The valves can then be replaced with distributors, in particular with rotary systems. Under these conditions, the cycle times mentioned above can then be divided by a factor of 2 to 10 as order of magnitude and may be only a few seconds.

All the latter points and others which we will be content with citing here, such as the use of adsorbent multilayers, of adsorbent exhibiting an affinity for argon, of variable-speed drive motors for the devices, such as the coupling of several identical units, and the like, constitute only known improvements to VPSA cycles optionally applicable in the context of the invention and will not be elaborated upon further in the context of this document.

The example relates to the production of a minimum flow rate of 120 tonnes per day of oxygen regarded as pure at a purity of 90 mol %. The product has to be available continuously and unvaryingly at a pressure of 1.35 bar abs. The site is close to sea level and the local conditions correspond to a temperate region of normal humidity.

The cycle selected is the cycle 7 described above with a high pressure of 1.50 bar abs and a low pressure of 0.35 bar abs.

4 adsorbers are used, each comprising 10 m³ of adsorbent with approximately 85 vol % of LiLSX. The cycle time is 36 seconds, i.e. a phase time of 9 seconds. Each of the individual stages is approximately 3 seconds. During stage 10, the atmospheric air is introduced slightly subsequently to the oxygen of purity C3, while the pressure in the adsorber is of the order of 0.45 bar abs. The stream C1 which constitutes the product is thus at 90 mol % $O_2$, the stream C2 is between 88 and 89% $O_2$ and the stream C3 is around 85% $O_2$. The air feed has a flow rate of 20 000 m³/h, the first vacuum pump VP1 has a flow rate also of approximately 20 000 m³/h, while the second vacuum pump VP2 has a flow rate of close to 30 000 m³/h.

In that way, an oxygen production of slightly greater than the 120 tonnes per day required is obtained, which corresponds to a productive output of approximately 90 Nm³/h/m³.

The specific energy depends essentially on the choice of the devices and more particularly on the optimization between performance levels, capital expenditure and simplicity. It can fall slightly below 0.3 KWh/Nm³, by favoring the performance level, or reach approximately 0.34 KWh/Nm³ with less sophisticated devices.

The use of phase-change material makes it possible to eliminate the majority of the thermal effects and makes possible a gain in productive output and a saving in specific energy which can exceed 10%.

It has been confirmed, by simulation, that the other cycles described in the present document gave results close to that of cycle 7, it being possible for operating conditions slightly different from those of the example to favor some cycle or other.

This reinforces the idea that the fundamental choices relate, on the one hand, to the production of oxygen at 3 levels of purity, namely:

for a required purity Pur1 of 93% $O_2$, a second stream of approximately between 91 and 92% $O_2$ and a third stream between 88 and 91 for a required purity Pur1 of 90% $O_2$, a second stream of between approximately 88 and 89% $O_2$ and a third stream between 85 and 87% and, on the other hand, to the use of these streams as elution and for the repressurization in an optimum order.

It should be noted that the stream C2 is produced during stage 3 alone, whereas it is used during stages 8, 9 and 11. In view of the duration of the stages, each of the order of 3 seconds, it is seen that it is advisable to use a holding tank for storing the amount of gas necessary for stage 8 and for stage 11, whereas that used during stage 9 can be withdrawn directly. In this case, there indeed exists one and the same mean purity for the streams corresponding to stages 8, 9 and 11. It might optionally be possible to construct a similar cycle with slightly different durations of stages, for example a shorter stage 9, which would result in a slight difference in composition between the amount stored and the amount used directly. Such a difference is not significant and the introduction of a fourth stream is not justified at the technical level. It is the same for the principle of the invention, which encompasses such insignificant variants.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the production of oxygen by adsorption of a stream of atmospheric air employing a VPSA comprising four adsorbers, one air compressor and two vacuum pumps, with each adsorber following the same pressure cycle with an offset of a phase time, comprising the following stages:

a) production of a first gas stream comprising an oxygen content C1 while charging upstream the adsorber with the stream of atmospheric air, b) production of a second gas stream comprising an oxygen content C2<C1, c) production of a third gas stream comprising an oxygen content C3<C2<C1 with simultaneous extraction of a waste stream enriched in nitrogen, d) elution of the adsorber, from which have emerged the three gas streams produced in stages a), b) and c), by the second gas stream produced in stage b) or of the third gas stream produced in stage c), e) repressurization of the adsorber which has been subjected to the elution of stage d) with successively at least two streams, a first and a second repressurization stream, having an increasing oxygen content, the first repressurization stream being the third gas stream produced in stage c) and the second repressurization stream being the second gas stream produced in stage b).

2. The process of claim 1, wherein the production of the second gas stream in stage b) is carried out by cocurrentwise depressurization.

3. The process of claim 1, wherein the production of the second gas stream in stage b) is carried out in two steps, a first step during which the production is carried out by cocurrentwise depressurization and a second step during which the production is carried out by a cocurrentwise depressurization combined with a countercurrentwise depressurization.

4. The process of claim 3, wherein the countercurrentwise depressurization is carried out by of a valve.

5. The process of claim 1, wherein the repressurization stage e) is carried out with successively 3 streams, a first, a second and a third repressurization stream, having an increasing oxygen content, the first repressurization stream being the third gas stream produced in stage c), the second repressurization stream being the second gas stream produced in stage b) and the third repressurization stream being the first gas stream produced in stage a).

6. The process of claim 1, wherein, in the repressurization stage e), the repressurization with the first repressurization stream is carried out simultaneously with the introduction of air cocurrentwise on the feed side of the adsorber for at least a portion of this stage.

7. The process of claim 1, wherein, in the repressurization stage e), the repressurization with the second repressurization stream is carried out simultaneously with the introduction of air cocurrentwise on the feed side of the adsorber for at least a portion of this stage.

8. The process of claim 5, wherein, in the repressurization stage e), the repressurization with the third repressurization stream is carried out simultaneously with the introduction of air cocurrentwise on the feed side of the adsorber for at least a portion of this stage.

9. The process of claim 1, wherein, after the 3 production stages a), b) and c) and before the elution stage d), the adsorber is subjected to a vacuum pumping stage.

10. The process of claim 1, wherein:
the pressure at the end of stage a) is between 1.75 and 1.25 bara,
the pressure at the end of stage b) is between 1.5 and 1.0 bara,
the pressure at the end of stage c) is between 1.0 and 0.7 bara, and
the low pressure of the pressure cycle is between 0.25 and 0.45 bara.

11. The process of claim 1, wherein the cycle time of said unit is less than 60 seconds.

12. The process of claim 1, wherein at least one vacuum pump comprises one or more stages, in parallel and/or in series, chosen from the group consisting of positive displacement devices of lobe, vane or liquid ring type.

13. The process of claim 1, wherein the air compressor continuously feeds one of the 4 adsorbers.

14. The process of claim 1, wherein the first gas stream produced in stage a) is sent at least in part to a first holding tank.

15. The process of claim 1, wherein the second gas stream produced in stage b) is sent at least in part to a second holding tank.

* * * * *